Patented Aug. 21, 1951

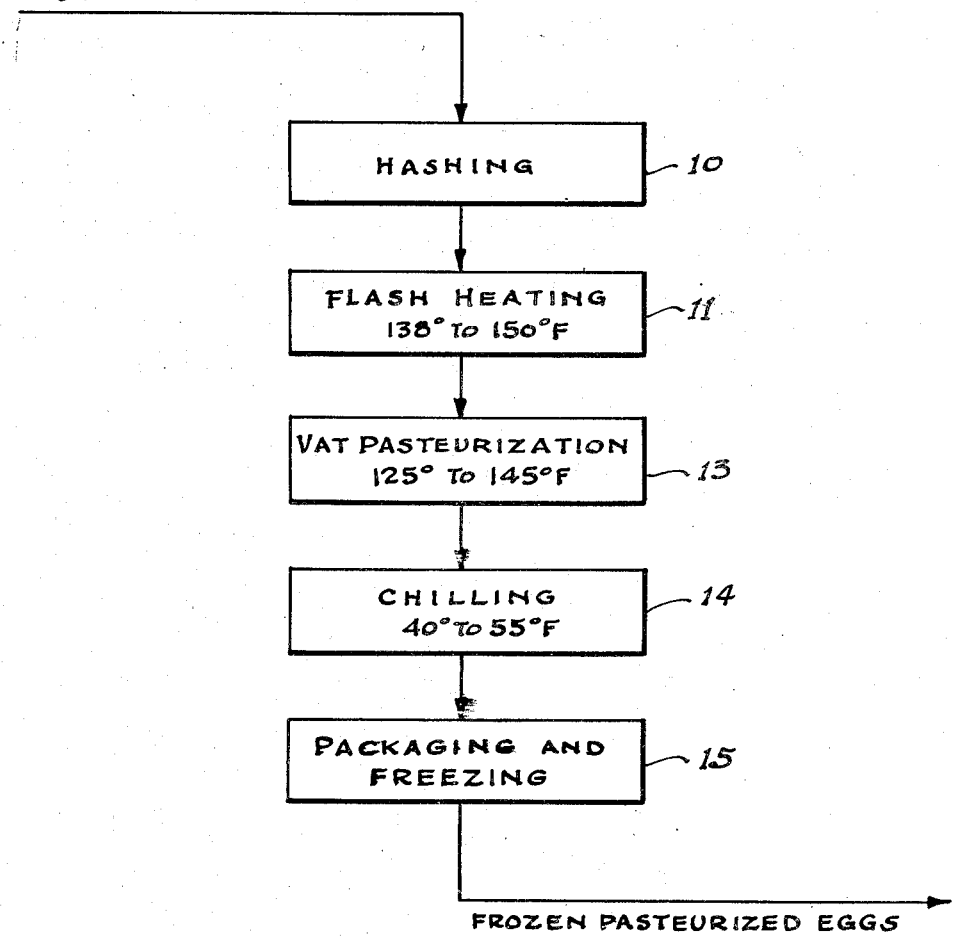

2,565,311

UNITED STATES PATENT OFFICE 2,565,311

EGG PASTEURIZATION

Carl H. Koonz and Floyd L. Kauffman, Chicago, Ill., assignors to Swift & Company, Chicago, Ill., a corporation of Illinois Application June 2, 1948, Serial No. 30,605

5 Claims. (Cl. 99—161)

This invention relates to egg pasteurization and, more particularly, to a process by which fresh whole eggs are treated in a manner to destroy bacteria therein.

The functions of pasteurizing eggs are generally twofold. One is to improve the keeping time in the bake shops. Most of the bacteria are destroyed during pasteurization; consequently, when the frozen pasteurized product is defrosted, it will show an improved keeping time in the bake shop. The other function of pasteurization is to kill or destroy bacteria organisms that are potentially pathogenic.

Heretofore, essentially two methods of pasteurizing eggs have been used. One has been called "vat pasteurization" which, if conducted properly, will often kill sufficient of the bacteria to improve the keeping time in the bake shop and will substantially destroy the pathogenic organisms. Vat pasteurization, however, is not particularly suitable for handling a large volume of product in commercial practice. The product is often overheated, and the eggs frequently show evidence of undue coagulation. Also, the time element involved in the type of operation is unfavorable for large operations, as a considerable length of time is required for filling the vat and heating the contents to pasteurization temperatures.

The second method for pasteurizing eggs that has been used is referred to as "flash pasteurization." In accordance with this method a sufficient number of bacteria are destroyed so that the keeping time of the product in the bake shop is definitely improved, but it is difficult to hold the product for a sufficient length of time at the pasteurizing temperatures employed (140° to 150° F.) to destroy the pathogenic bacteria. The flash pasteurization usually involves the use of a tubular type of heater, and attempts have been made to use a sufficient length of pipe to cause destruction of the pathogenic organisms. However, such equipment presents difficulties in handling large volumes of product.

In accordance with the present invention, the egg material, which may be of a homogenous mixture of a whole egg product, is subjected to a two-step pasteurization process. In the first step, the product is rapidly heated or flash heated to around the pasteurization temperature: for example, about 138° F. to 150° F. and preferably approximately 140° F. This initial heating operation is almost instantaneous, usually requiring merely a matter of seconds. The homogenous egg mixture, brought to at least about an effective pasteurization temperature, is then transferred to a vat for conducting the second step of our process. The vat preferably has such a capacity and suitable temperature controls so that the product can be held for sufficient length of time at the effective pasteurization temperature to produce the desired pasteurization. For example, we have found a holding period of about 2 to 30 minutes at 125° F. to 145° F., and preferably about 10 minutes at 140° F., to be satisfactory.

Prior suggestions relative to vat pasteurization of eggs have involved the slow heating of the eggs after they have been introduced into a large container or vat, holding them at the elevated temperature for a substantial period of time, and then cooling the eggs in the vat. Constant agitation of the eggs in the vat has been required in an effort to uniformly heat the contents of the vat. Despite the constant agitation, it has been found impossible to prevent coagulation of a substantial portion of the egg material due to local overheating. A layer of coagulated material builds up on the walls of the vat or upon heating elements immersed in the vat since the temperature of the heated walls or heating elements must be substantially higher than the average temperature of the eggs in order to impart heat to the contents of the vat. Such coagulated layers constitute heat insulation, further increasing the difficulties of heating the egg material.

It is, therefore, an object of the present invention to proivde an improved process of pasteurizing eggs in which bacteria in the eggs are substantially destroyed without coagulation of the eggs.

Another object of the invention is to provide an improved process of pasteurizing eggs which is especially effective in killing sufficient numbers of predominant flora in eggs to improve the keeping time in the bake shop and at the same time to destroy substantially all of the pathogens which may be present.

The steps of the present process are indicated in the attached drawing which is a schematic flow sheet of the steps of the process.

Referring to the drawing, whole eggs are hashed or mixed, as indicated at 10, and are delivered to a flash-heating step, indicated by 11. The apparatus employed in the flash-heating step may be any known or suitable device conventionally employed for flash-heating operations. The most satisfactory flash-heating apparatus for eggs involves the spreading of the hashed eggs as a thin layer upon a heated surface, followed by a rapid removal of the heated material from the heated surface. Suitable devices for this purpose are known in the art. Examples of such devices are various types of plate heaters. Also, "Votators," such as shown in U. S. Patents Re. 21,406; 1,783,865; 1,783,866; 1,847,149; 1,940,473; 1,965,618; 2,013,025; and 2,063,066, may be used. Flash heating may also be accomplished by pumping the material through pipe coils surrounded by a heating medium, although heaters of the "heated plate" or "Votator" type are preferred. In such heating devices, the temperature of the hashed eggs may be raised from room temperature to about 138° F. to 150° F. in a short period of time ranging from approximately 20 seconds to 5 minutes, depending upon the particular device employed, without increasing the temperature of any portion of the eggs substantially above the temperature given above.

The heated material discharged from the heating step is subjected to a vat pasteurization step as indicated at 13. In the vat pasteurization step, the material is introduced into a vat or container and held without agitation for the desired period of time. The walls of the vat or container may be heat insulated to prevent a drop in temperature of the outer portions of the material therein. The period of time during which the eggs are held at a temperature between 125° F. and 145° F. will depend upon the exact temperature selected but will usually range from approximately 2 minutes to 30 minutes.

The eggs which have been heat treated in the vat pasteurization step 13 are withdrawn from the vat and chilled in any desired manner in a chilling step, indicated at 14, to a temperature between approximately 40° F. and 55° F. in any suitable type of apparatus, such as that discussed above with respect to the heating step 11. The material may then be introduced into a suitable type of package, such as metal cans or waxed paper cartons, after which the chilled material may be frozen, the packaging and freezing steps being indicated at 15. The frozen, pasteurized eggs may then be marketed in frozen form.

The present invention has the advantage of providing a simple and efficient method for pasteurization of large volumes of eggs. Also, the method of the invention is substantially foolproof in that all portions of the egg are subjected to uniform temperature treatment. The product of the present invention is substantially sterile and yet is practically free of coagulated material.

While we have disclosed the preferred embodiment of our invention, it is understood that the details thereof may be varied within the scope of the following claims.

We claim:

1. The process of continuously pasteurizing whole fresh eggs which comprises: flash heating a stream of hashed whole eggs to a temperature between approximately 138° F. and 150° F. by passing the hashed eggs in a thin layer through a heating zone, promptly subjecting the heated eggs to a temperature between about 125° F. and 145° F., holding the eggs at the last-mentioned temperature for about 2 to 30 minutes to substantially completely destroy bacteria contained in said eggs, and thereafter promptly chilling said eggs.

2. A process of pasteurizing eggs which comprises: passing a stream of the egg material in a thin layer through a heating zone wherein said egg material is flash heated to a pasteurizing temperature of about 138°-150° F. and thereafter maintaining the heated eggs at a pasteurizing temperature of about 125°-145° F. for about 2 to 30 minutes to destroy the predominant flora of bacteria in the eggs.

3. A process of pasteurizing fresh eggs which comprises: subjecting egg material in a thin layer to flash heating whereby the egg material is raised to a pasteurizing temperature about 138°-150° F. in several seconds, maintaining the heated egg material at a pasteurizing temperature of about 125°-150° for several minutes to destroy the bulk of the bacteria in the eggs, and promptly chilling the eggs.

4. A process substantially as described in claim 3 in which the eggs are flash heated to about 140° F.

5. A process substantially as described in claim 3 in which the eggs, after flash heating, are maintained at a pasteurizing temperature of about 140° F. for a period of about 10 minutes.

CARL H. KOONZ.
FLOYD L. KAUFFMAN.

REFERENCES CITED

The following references are of record in the file of this patent:

UNITED STATES PATENTS

| Number | Name | Date |
|---|---|---|
| Re. 19,898 | Fousek | Mar. 24, 1936 |
| 2,093,786 | Swarthout | Sept. 21, 1937 |
| 2,423,233 | Funk | July 1, 1947 |